United States Patent
Lang et al.

[15] 3,644,113
[45] Feb. 22, 1972

[54] AGGLOMERATE INCLUDING GRAFT COPOLYMERS OF ACYLIC ACID AND METHYL CELLULOSE AND METHOD OF MAKING

[72] Inventors: William J. Lang, Libertyville, Ill.; Joseph M. Chelini, Denver, Colo.

[73] Assignee: International Minerals & Chemical Corporation

[22] Filed: Sept. 4, 1968

[21] Appl. No.: 757,468

[52] U.S. Cl. .................................. 75/3, 71/27, 99/2, 260/17 A, 260/41 B
[51] Int. Cl. ............... C21b 1/26, C08f 25/00, C08f 43/00
[58] Field of Search ................ 75/3, 4; 260/17 A, 41 B; 204/159.12, 160.1

[56] References Cited

UNITED STATES PATENTS

| | | | |
|---|---|---|---|
| 3,167,525 | 1/1965 | Thomas | 260/41 B |
| 3,298,979 | 1/1967 | Hagemeger et al. | 260/17 A |
| 3,370,031 | 2/1968 | Grommers et al. | 260/17 A X |
| 3,455,853 | 7/1969 | Dekking | 260/17 A X |

*Primary Examiner*—Allen B. Curtis
*Attorney*—James E. Wolber and Peter Andress

[57] ABSTRACT

Water-soluble graft copolymers of acrylic acid and methyl cellulose, including water-soluble salts thereof, are useful as binders in the agglomeration of finely divided materials. The graft copolymers are especially useful as binders in the pelletization of minerals and ores, such as taconite.

21 Claims, No Drawings

AGGLOMERATE INCLUDING GRAFT COPOLYMERS OF ACYLIC ACID AND METHYL CELLULOSE AND METHOD OF MAKING

BACKGROUND OF THE INVENTION

This invention relates to a process for the agglomeration of various types of finely divided materials. More particularly, this invention relates to an improved process for pelletizing metallic minerals and ores resulting in pellets having increased strength and cohesiveness. Still more particularly, this invention relates to the use of water-soluble graft copolymers of acrylic acid and methyl cellulose, including water-soluble salts thereof, as pelletizing binders in such a process, which graft copolymers produce pellets of such increased strength, cohesiveness and the like that they are attrition resistant and able to withstand mechanical and thermal shock.

The agglomeration of various types of materials is well known. There are many processes of agglomeration and devices for agglomeration. They all have in common the physical upgrading in size, density, and uniformity of finely divided materials for better processing, recovery, or handling, usually by using a suitable binder.

Agglomeration is commercially used in industries where materials are encountered in a form which is too finely divided for efficient and convenient subsequent processing and/or handling. The material might be encountered in such a finely divided condition because it occurs naturally or is produced in this condition, or because it may have been reduced to this condition for the purpose of or during prior processing. It may be necessary or desirable to agglomerate the finely divided particles into sinters, briquets, or pellets for further processing.

The metal-refining industry is an industry where agglomeration is especially useful. In many metallurgical operations ore is encountered in a very finely divided condition as a result of being reduced to this condition for the purposes of beneficiation. Typical of such an ore is taconite, a very low-grade iron-containing rock which is reduced to a finely divided condition and then subjected to a beneficiation procedure in order to concentrate the iron and to make available an ore of the required richness for conventional blast furnace operation. Unless the taconite which is obtained from the beneficiation process is converted into pellets, the finely divided ore presents many dust problems in handling and may be blown out of the blast furnace by the air and combustion products sweeping up through the flue of the blast furnace. The same result would occur through the use of flue dust, which, while it could be collected and reused, nevertheless in subsequent reuse without being pelletized would again be lost through the flue. In other metallurgical operations on other ores similar difficulties may be present which make it desirable or necessary to have the ore present in the form of pellets even though it may have been in a very finely divided form in its preceding processing.

Therefore, while the instant invention is applicable to the agglomeration of a number of different types of finely divided materials, it will be described with reference to taconite pelletizing for the purpose of illustration. In taconite processing the finely divided ore is converted into pellets which are almost spherical and have a diameter varying from about one-half inch to 1 inch or more. These pellets are formed by agglomerating wet taconite in a suitable device, such as by rolling in a balling drum, and the pellets thus formed are then sintered in a furnace. The pellets become weaker as a result of being dried out during the sintering operation, and as a result may be crushed by the weight of pellets above them when stored in piles. These crushed pellets produce dust which is very undesirable.

A variety of substances have been used or have been suggested for use as binders in order to give compression or "green" strength to the pellets with concomitant increase in pellet size. Prior art substances such as pickle liquor, lime, starch and other naturally occurring organic materials have been tried with little success. These prior art binders either fail to impart the required green strength to the pellets or commonly fail to increase the pellet size to that sufficient for efficient utilization in the subsequent blast furnace operation.

Another material which has been commonly used as a binder is bentonite, a naturally occurring clay. The western or natural sodium bentonitic clays have almost exclusively been used as binders in taconite pelletizing since it has been found that these clays produce pellets which are superior to the pellets produced when native or subbentonitic clays are used. The difference in the properties imparted to the pellets is apparently due to differences in the chemical and mineralogical compositions of the clay. Subbentonitic clays are generally calcium or magnesium varieties of montmorillonite and may contain substantial proportions of nonclay or nonmontmorillonite impurities. The bentonitic clays are natural sodium clays and are sometimes hereinafter referred to as merely "bentonitic" clays.

The use of clay as a binder for taconite pellets suffers from the disadvantage of adding silica to the pellets. This silica, the major chemical component of all bentonites, creates large amounts of unusable and deleterious slag in the blast furnace operation. It, therefore, becomes necessary to use a calcium carbonate-containing material, preferably limestone, as a flux to remove the silica contained in the bentonite during the blast furnace operation. Another disadvantage in the use of clay as a binder is that it is generally necessary to use a western or natural sodium bentonitic clay. This limitation on the type of useful clay presents a disadvantage in areas where the subbentonitic type of clay is more economically available.

It would, therefore, be an advantage to the art if a binder could be introduced into the finely divided taconite to be pelletized so as to promote pellet nucleation, allow a rapid pelletization, and impart a "green" or compression strength to the formed pellets to allow considerable physical handling without breakdown in pellet size or shape. Another advantage would be realized if this binder could be used in combination with a western bentonite so as to reduce the quantity of clay required. Still another advantage would be realized if this binder could be used in combination with a native or subbentonitic clay in order to make a clay, which was heretofore unacceptable for use as a binder, a satisfactory binder.

SUMMARY OF THE INVENTION

This invention is based on the discovery that water-soluble graft copolymers of acrylic acid with methyl cellulose, including water-soluble salts thereof, are eminently useful in the agglomeration of finely divided materials. The graft copolymers of this invention may be used either as the sole binder or in combination with bentonite type clays of both the western or bentonitic and native or subbentonitic types. The graft copolymers and clay combinations are especially useful as binders in the agglomeration of finely divided materials with which clays have heretofore been used as binders. When used in combination with the bentonite-type clays, the graft copolymers are effective to reduce the quantity of clay required and/or to enhance the effectiveness of the clay as a binder.

Therefore, in one aspect the present invention is directed to a method of agglomerating finely divided particles using a binder comprising a water-soluble graft copolymer of acrylic acid with methyl cellulose, including water-soluble salts thereof, and the resulting agglomerates.

In another aspect, the present invention is directed to a method of producing agglomerates of finely divided particles using a binding amount of a water-soluble graft copolymer of acrylic acid with methyl cellulose, including water-soluble salts thereof, or a combination of such a copolymer and a betonite-type clay, and the resulting agglomerates.

In still another aspect, the present invention is directed to a method of pelletizing finely divided particles of a mineral or ore such as taconite using a binding amount of a bentonite type of clay and a water-soluble graft copolymer of acrylic acid with methyl cellulose, including water-soluble salts thereof, said graft copolymer being present in an amount sufficient to produce pellets which have a greater strength and cohesiveness than if the clay alone were used, and the resulting pellets.

In a further aspect, the present invention is directed to a method of pelletizing finely divided particles of a mineral or ore such as taconite using a binder consisting essentially of a water-soluble graft copolymer of acrylic acid with methyl cellulose, including water-soluble salts thereof, and a native or subbentonitic clay, said graft copolymer being present in an amount sufficient to enhance the effectiveness of the clay as a binder, and the resulting pellets.

In a still further aspect, the present invention is directed to a method of pelletizing finely divided particles of a mineral or ore such as taconite using a binder consisting essentially of a western bentonite (natural sodium bentonitic clay) and a water-soluble graft copolymer of acrylic acid with methyl cellulose, including water-soluble salts thereof, and the resulting pellets.

DESCRIPTION OF THE PREFERRED EMBODIMENTS

The graft copolymers of this invention are useful as binders, either alone or in combination with a bentonite type clay, in processes for the agglomeration of a wide variety of finely divided materials. The material to be pelletized in accordance with this invention may be almost any type of metallic mineral or ore. For example, the predominant metal constituent may be lead, copper, nickel, zinc, uranium, iron, and the like. Mixtures of the above metals or any other metal occurring in the free or molecularly combined natural state as a mineral, or any combination of the above, or other metals which are capable of pelletization may be agglomerated in accordance with this invention. Particularly effective results are realized in the pelletization of minerals predominantly containing iron. The material to be pelletized may contain iron ore deposits coming directly from the mining site, from ore "tailings," flue dust, cold and hot fines from a sinter process, or iron ore which is found in a sludge condition as aqueous iron ore concentrates from natural sources or recovered from various processes. Any one of these sources of iron or any possible combination thereof may be employed according to their availability and particular process setup of the pelletizing unit. Iron ore or any of a wide variety of the following minerals may form a part of the material to be pelletized: magnetite, hematite, limonite, goethite, siderite, franklinite, ilmenite, chromite, pyrite, and the like.

Minerals other than metallic minerals which may be agglomerated in accordance with this invention include phosphate rock, limestone, talc, and dolomite. Still other materials which may be agglomerated in accordance with this invention are fertilizer materials, such as potassium sulfate, potassium chloride, and the double sulfate of potassium and magnesium; magnesium oxide; animal feeds such as calcium phosphates; carbon black; coal fines; sodium bisulfate; catalyst mixtures; refractory gunning mixes; glass batch mixes; tungsten carbide; and antimony.

The material to be agglomerated is desirably about 90 percent −100 mesh. Finely divided material having a size of about 90 percent −200 mesh is most appropriate for the practice of this invention, but material as small as about 90 percent −325 mesh can be employed.

The graft copolymers which are useful in the method of this invention are water-soluble graft copolymers prepared by copolymerizing acrylic acid with a minor amount of methyl cellulose, and water-soluble salts thereof. The amount of the methyl cellulose which is reacted with acrylic acid may vary between about 0.1 and about 10.0 percent, preferably between about 0.25 and about 5.0 percent, based on the total weight of the acrylic acid used.

The graft copolymerization can be carried out by using well-known polymerization techniques. Ultraviolet light or any of the well-known peroxygen-type initiators, e.g., peroxide-free radical initiators, may be used. The preferred peroxygen-type initiators are hydrogen peroxide and hydroperoxides such as t-butyl hydroperoxide, diisopropylbenzene hydroperoxide, cumene hydroperoxide, 1-phenylethyl hydroperoxide, and the like. Other useful peroxide initiators are diacyl peroxides such as benzoyl peroxide and acetyl peroxide, and dialkyl peroxides such as di-t-butyl peroxide and dicumyl peroxide. Still other useful peroxygen-type initiators include per-salts such as sodium, potassium or ammonium persulfate and sodium perborate; the peresters such as t-butyl peroxyacetate and t-butyl peroxybenzoate; and the peracids such as performic acid, peracetic acid, perbenzoic acid, and peroxylactic acid. If desired, Redox-activated systems can be used in accordance with the useful polymerization practices. Thus, sodium bisulfite-potassium persulfate and hydrogen peroxide-ferrous ion systems may be employed. However, the incremental addition of the peroxygen-type initiator is preferred when a Redox-activated system is utilized.

The quantity of the initiator employed can be varied depending on the reaction temperature and other conditions, but will ordinarily be from about 0.0005 to about 0.01 percent, preferably from about 0.002 to about 0.004 percent, based on the weight of the acrylic acid.

The temperature of the reaction is not critical and may vary between about −5° C. and about 100° C. The preferred temperature range is between about 40° C. and about 80° C., with a temperature between about 60° C. and about 70° C. being most preferred. The reaction may be carried out under superatmospheric pressure or even under partial vacuum. However, it is preferred to utilize atmospheric pressure for convenience since the reaction runs very favorably at this pressure.

The graft copolymerization reaction is carried out in an acidic aqueous medium. The pH of the reaction medium may be any value up to and including about 3.5. It is preferred to maintain the pH between about 3.0 and about 3.5 for optimum results. In the event the amount of acrylic acid utilized is not sufficient to lower the pH of the reaction medium to a value of 3.5 or lower, the desired pH may be obtained by the addition of a suitable mineral acid such as sulfuric acid, nitric acid or hydrochloric acid.

The reactants and the initiator are combined in the aqueous reaction medium in any conventional manner. However, the initiator should not be added to the reaction medium containing only the acylic acid since this could cause the polymerization of the acrylic acid in the absence of the methyl cellulose. As illustrative of a suitable manner of combining the reactants, the acrylic acid and methyl cellulose are each dissolved in separate amounts of water so as to provide homogeneous solutions thereof. These solutions are mixed and the initiator is then added to the mixed solution. Alternatively, the methyl cellulose may be dissolved in water to provide a homogeneous solution to which the acrylic acid and the initiator are added. Other methods of combining the reactants and initiator will be obvious to one skilled in the art. Optimum results will be obtained if the methyl cellulose is thoroughly dissolved in at least a part of the aqueous reaction medium before it is combined with the acrylic acid. Stirring or shaking of the reaction mixture will facilitate the polymerization and result in more uniform polymers.

The reaction time will vary according to the reaction temperature and/or quantity of the initiator present. In general, the time should be sufficient to consume at least 95 percent of the acrylic acid. To illustrate the variance of the reaction time at different temperatures, polymerization will be evident in about 5 to 7 hours when acrylic acid is reacted at 60° C. with about 1.0 percent by weight of the methyl cellulose, based on the weight of the acrylic acid, and 0.002 percent by weight of hydrogen peroxide, based on the weight of acrylic acid, is present. On the other hand, polymerization will be complete in about 15 to 20 minutes when the reaction is carried out at 100° C. using the same relative amounts of the reactants and the initiator. Polymerization may be detected by a change in refractive index, and completion of the reaction may be detected by the absence of the distinctive odor of acrylic acid.

At the completion of the polymerization reaction, the copolymer thus produced may be converted to the salt form. This conversion is generally effected by neutralization with an appropriate hydroxide. Alkali metal or ammonium salts of the copolymers such as sodium, potassium and lithium salts may be obtained by reacting the copolymers with the corresponding hydroxide. Where complete neutralization is desired, a stoichiometric amount, and preferably a slight excess, of the hydroxide is used. Partial salts may, of course, be produced by using less than the quantity of alkali metal or ammonium hydroxide to effect complete conversion of the carboxyl groups.

The copolymers, in either the acid form or the salt form, may be converted to a dry form if so desired. This may be accomplished by conventional techniques, such as by heating the aqueous solution of the copolymer in a drum drier at a temperature of about 105° C. to drive off the water and yield a dry polymer.

The graft copolymers may be used in either the acid or salt form as the sole binder or in combination with a bentonite clay. The combination of the graft copolymer and a clay will be especially useful in the agglomeration of materials such as taconite which have heretofore been agglomerated by the use of clay. Bentonite clays of both the western or natural sodium bentonitic types and native or subbentonitic types may be used. When a subbentonitic or calcium montmorillonite type of clay is used, the clay is preferably first treated with an alkali metal compound which is water soluble, ionizable, and has an ion capable of reacting with calcium to form a water-soluble precipitate. Such compounds include, as for example, alkali metal carbonates, hypophosphates, oxalates, phosphates, silicates, sulfites, and tartrates. Sodium carbonate or soda ash is particularly preferred. The amount of the alkali metal compound employed will be somewhat dependent upon the proportion of calcium montmorillonite in the clay. In general, amounts of from about 0.5 to about 6 percent by weight of the clay will be used. The preferred quantities for treatment are from about 2 to about 4 percent by weight of the clay.

The amount of the graft copolymer, including salts such as ammonium or alkali metal salts, or combination of clay and graft copolymer added to the material to be agglomerated will vary according to the particular needs of the agglomerating operation. In general, satisfactory results are obtained when from about 0.002 to about 20 pounds of graft copolymer per ton of material to be agglomerated and from 0 to about 30 pounds of bentonite per ton of material to be agglomerated are employed.

When the graft copolymer is to be utilized as a sole binder, i.e., when no bentonite is employed, the graft copolymer will generally be used in the amount of from about 0.2 to about 20 pounds per ton of material to be agglomerated. An amount of from about 0.5 to about 5 pounds of graft copolymer per ton of material is preferably used in iron ore pelletization operations, with an amount in the range of from about 1 to about 2 pounds per ton being most preferred.

When the graft copolymer is utilized in combination with a bentonitic clay for agglomerating a mineral or ore such as taconite, the amount of the clay will be indirectly proportional to the amount of graft copolymer utilized. A mixture of from about 0.002 to about 0.15 pound of graft copolymer and from about 8 to about 30 pounds of bentonitic clay per ton of material to be agglomerated will be typical. When the graft copolymers are utilized in combination with a subbentonitic clay for agglomerating a mineral or ore such as taconite, the amount of the clay utilized will generally be in the amount of from about 12 to about 30 pounds per ton of material to be pelletized. The amount of the polymer used in combination with the subbentonitic clay will be sufficient to enhance the effectiveness of the clay as a binder, which will generally be the amount from about 0.004 to about 0.15 pound per ton of material to be agglomerated.

The only other ingredient required in the process of this invention in addition to the finely divided material to be agglomerated and the graft copolymer (possibly in combination with clay) is water. In general, moisture is required to promote compactness and adhesiveness of the agglomerates so that they may withstand subsequent handling. The water operates in conjunction with the binder to give good binding action. The mixture to be agglomerated will generally contain from about 2 to about 20 percent by weight of water, based on the weight of the finely divided material. A typical moisture content in processes for pelletizing minerals and ores such taconite will be from about 5 to about 12 percent by weight of water, based on the weight of the material to be agglomerated. The water content of a taconite-containing mixture to be agglomerated will preferably be in the range of from about 8.5 to about 10.5 percent by weight of water, based on the weight of the taconite.

When the graft copolymer and clay are used in the process of this invention for the pelletization of iron ore, such as taconite, the mixture to be pelletized may also contain a small amount of flux material chosen from a number of known substances. The presence of this flux material might be desirable to aid in in the removal of the silica content of the clay from the metal melt as slag. A calcium carbonate containing substance is generally employed because of availability and low cost. Among these, limestone or an impure source of limestone such as calcite is suitable.

In the practice of this invention, the graft copolymer may be added to the finely divided material to be agglomerated at any time prior to the agglomeration operation. The components of the agglomeration mixture (i.e., finely divided material, water, graft copolymer and clay, if used in combination with the graft copolymer) may be mixed in any conventional manner and in any order. However, as hereinbefore pointed out, it is preferred that any alkali metal compound such as soda ash be added to the clay before the clay is combined with any of the other components of the agglomeration mixture when a subbentonitic clay or calcium bentonite is used. In addition, when iron ore is pelletized in accordance with this invention, the graft copolymers are preferably not combined with the iron ore until just prior to the agglomeration operation. The effectiveness of the graft copolymers as a binder might deteriorate if the graft copolymers are admixed with the iron ore for a substantial period of time, e.g., 8 hours, prior to the agglomeration operation.

Suitable methods for combining the components of the agglomeration mixture will be readily apparent to one skilled in the art. For example, the graft copolymer may be mixed in a dry finely divided form with the finely divided material to be agglomerated (and the clay, if used) to form a composition to which only the correct amount of water need be added. Inasmuch as the graft copolymers are water soluble in both the acid and salt forms, they may be added in an aqueous solution to the dry finely divided material to be agglomerated. In still another alternative method of combining the components of the agglomeration mixture, the acid or salt form of the graft copolymer may be added in the dry form or in an aqueous solution to clay before the clay is combined with the finely divided material. When an aqueous solution of the graft copolymer is utilized, the concentration of the solution may be adjusted to yield an agglomeration mixture of the desired total moisture content.

Intermixture of the components of the agglomeration mixture may be performed by hand, in an internal mixer, in a paddle-type mixer, or in a mulling machine. No particular care as to time and temperature of mixing need be exercised.

No criticality is claimed in the utilization of a particular type of agglomerating apparatus, and any of the well-known types of agglomerating devices may be used in the process of this invention. For example, the agglomeration may be carried out by a disc or drum pelletizer. This device, which is especially useful in the pelletization of minerals and ores such as taconite, comprises a rotating inclined surface which agglomerates the mixture into pellets while flowing upon the revolving inclined surface. Multiple-cone drum pelletizers are particularly desirable. Other types of agglomerating devices useful in the process of this invention are pug mills, compacting and granulating mills, extruders, and the like.

The agglomeration mixture charged to the agglomerating device will then be formed into balls or pellets of the desired size. For example, in the pelletization of taconite, the agglomeration mixture is charged to a disc or drum pelletizer which is operated to produce balls or pellets having a size of about 1 inch diameter. The resulting balls or pellets are then removed from the pelletizer and fed to a drying oven where they are dried to a maximum moisture content of about 0.2 percent.

The following nonlimiting examples will serve to further illustrate this invention.

EXAMPLE I

This experiment was conducted to demonstrate the effectiveness of the graft copolymers of this invention as a sole binder for finely divided materials. Several quantities of a hematite iron ore concentrate having a particle size of about 90 percent minus 325 mesh were blended in a mulling machine and shredder with varying amounts of water and 0.075 percent by weight, based on the weight of the ore, of a sodium salt of an acrylic acid-methyl cellulose graft copolymer produced as outlined above.

Pellets were made from each of the mixtures thus prepared by rolling in a 16-inch drum, rotated at 53 r.p.m. or 225 lineal feet per minute. A handful of a mixture was first rolled until "seeds" or small pellets were formed. A small amount of water was added to the pelletizer to aid the growth of these seeds. The contents of the pelletizer were then removed and screened to minus 5, plus 4 mesh. The seeds were returned to the drum and rolled with more of the agglomeration mixture to build the seeds to pellet size. The agglomeration mixture was fed to the pelletizer at a rate to build the seeds to pellet size in about 3 minutes. The pellets were removed from the pelletizer and screened to minus 0.525, plus 0.5 inch, and the screened pellets were then tested.

The average moisture content of each quantity of the product pellets was determined by weighing 15 of the pellets, and then drying them at about 130° C. for 10 minutes. The dried pellets were reweighed and the percent moisture of the pellets was calculated.

The dry compression strength was determined by testing 10 of the 15 dry pellets for crushing with a modified Harry W. Dietert Company sand-strength testing machine. The scale was read at the point of fracture of each pellet, and the average of the 10 readings was multiplied by a correction factor of pi (3.141).

The green compression strength of the pellets was determined by testing 10 green pellets taken from the screened product of the pelletizer in the method outlined above for testing the dry compression strength.

The "drop number" of the pellets was determined by dropping 10 green pellets obtained from the screened product of the pelletizer from a height of 18 inches upon a hard surface. These pellets were dropped until they broke and the average of the number of drops of the pellets was determined.

The results obtained in this experiment are shown in Table I.

TABLE I

| Additive | % Moisture | Green Comp. Strength, p.s.i. | Dry Comp. Strength, p.s.i. | Drop Number |
| --- | --- | --- | --- | --- |
| 0.075% copolymer | 9.1 | 3.0 | 29 | 24 |
| | 10.0 | 3.0 | 23 | 31 |
| | 10.8 | 3.2 | 22 | 60 |

This data clearly show that the graft copolymers of this invention are very effective binding agents in the agglomeration of finely divided material over a relatively wide moisture range. The pellets exceeded the specification minimum commonly used in the taconite industry for pellet properties using a binder of 12 pounds of sodium bentonite per ton of taconite, which are as follows:

| Green compression strength | 2–3 p.s.i. |
| --- | --- |
| Dry compression strength | 8–10 p.s.i. |
| Drop number | 6–8 |

EXAMPLE II

Another series of experiments was conducted to demonstrate the usefulness of the graft copolymers of this invention as binders in combination with clay. The procedure outlined in Example I was followed, except that 0.15 percent by weight, based on the weight of the clay, of the sodium salt of an acrylic acid-methyl cellulose graft copolymer was used in combination with a western bentonite, a well-known commercial binder used in the agglomeration of iron ore. The bentonite was used in the amounts of 12 pounds per ton of concentrate (0.6 percent by weight) which is the amount commonly used for bentonite evaluation in the taconite industry, and two-thirds this amount or 8 pounds per ton of taconite (0.4 percent by weight). In addition, blanks using the clay without graft copolymers were run at these clay amounts. The results of this series of experiments are shown in Table II.

TABLE II

| Additive | % Moisture | Green Comp. Strength p.s.i. | Dry Comp. Strength p.s.i. | Drop number |
| --- | --- | --- | --- | --- |
| 0.6% western bentonite | 8.20 | 3.42 | 22.36 | 2.7 |
| Do. | 8.99 | 4.05 | 19.67 | 9.2 |
| Do. | 9.24 | 3.89 | 17.96 | 11.8 |
| 0.6% western bentonite and 0.0009% copolymer | 8.60 | 4.24 | 20.63 | 8.9 |
| Do. | 9.30 | 4.02 | 21.38 | 15.7 |
| Do. | 10.4 | 5.71 | 15.42 | 36.5 |
| 0.4% western bentonite | 8.37 | 3.86 | 14.26 | 5.0 |
| Do. | 9.02 | 3.14 | 14.82 | 6.3 |
| Do. | 9.45 | 2.61 | 13.91 | 10.8 |
| 0.4% western bentonite and 0.0006% copolymer | 8.62 | 3.27 | 13.03 | 7.4 |
| Do. | 8.73 | 3.36 | 16.05 | 8.2 |
| Do. | 9.04 | 4.11 | 14.85 | 8.8 |
| Do. | 9.58 | 3.45 | 14.82 | 11.5 |

The usefulness of the graft copolymers in this invention in combination with a western bentonite as a binder will be readily apparent from a review of the data of Table II. For example, it will be noted that the pellets produced using the polymer in combination with 8 pounds of clay per ton of concentrate exceeded the minimum specifications of the taconite industry for when clays are used in the amount of 12 pounds per ton of taconite.

EXAMPLE III

Another series of experiments was conducted to demonstrate the usefulness of the graft copolymers of this invention for use in combination with a calcium bentonite to produce satisfactory pellets. The procedure of Example II was followed except that the clay was a calcium bentonite treated with soda ash. The results of these examples are shown in Table III.

TABLE III

| Additive | % Moisture | Green Comp. Strength p.s.i. | Dry Comp. Strength p.s.i. | Drop number |
| --- | --- | --- | --- | --- |
| 0.6% calcium bentonite treated with 5% soda ash, by weight of clay | 8.4 | 3.5 | 18.3 | 5.6 |
| Do. | 8.8 | 3.5 | 18.5 | 7.1 |
| Do. | 9.4 | 3.7 | 17.8 | 14.9 |
| 0.6% calcium bentonite treated with 3% soda ash, by weight of clay, and 0.0006% copolymer | 10.4 | 4.2 | 23.4 | 19.0 |
| Do. | 10.5 | 3.7 | 22.4 | 26.2 |

In reviewing Table III it will be noted that the pellets produced from the graft copolymer-containing polymerization mixture were superior to the pellets produced when the polymer wasn't present but soda ash was used in a greater amount.

Although this invention has been described in relation to specific embodiments, it will be apparent that obvious modifications may be made by one skilled in the art without departing from the intended scope of this invention as defined by the appended claims.

What is claimed is:

1. In a method of agglomerating a wetted mass of a finely divided material, the improvement which comprises the step of adding to said wetted mass, prior to the agglomeration thereof, at least a binding amount of a water-soluble graft copolymer or a mixture of said graft copolymer and a bentonite clay, said graft copolymer being a graft copolymerization product of acrylic acid and from about 0.1 to about 10 percent by weight, based on the weight of said acrylic acid, of methyl cellulose, or a water-soluble salt of said graft copolymerization product.

2. A method in accordance with claim 1 wherein said graft copolymerization product is an ultraviolet light or peroxygen-type compound induced graft copolymerization product, and from about 0.002 to about 20 pounds of said graft copolymer per ton of said material and from zero to about 30 pounds of a bentonite clay per ton of said material is added to said wetted mass.

3. A method in accordance with claim 1 wherein said graft copolymerization product is a peroxide free radical induced graft copolymerization product, and said wetted mass contains from about 2 to about 20 percent by weight of water, based on the weight of said material.

4. A method in accordance with claim 3 wherein from about 0.2 to about 20 pounds of said graft copolymer per ton of said material is added to said wetted mass.

5. A method in accordance with claim 3 wherein said finely divided material is a mineral.

6. A method in accordance with claim 5 wherein said bentonite clay is a bentonitic clay.

7. A method in accordance with claim 5 wherein said bentonite clay is a subbentonitic clay.

8. A method in accordance with claim 7 wherein said bentonite clay is a soda ash treated subbentonitic clay.

9. A method in accordance with claim 5 wherein from about 0.5 to about 5 pounds of said graft copolymer per ton of said material is added to said wetted mass.

10. A method in accordance with claim 9 wherein said finely divided material is an iron ore and said wetted mass contains from about 5 to about 12 percent by weight of water, based on the weight of said material.

11. A method in accordance with claim 10 wherein said finely divided material is taconite.

12. A method in accordance with claim 10 wherein from about 0.002 to about 0.15 pound of said graft copolymer per ton of said material and from about 8 to about 30 pounds of a bentonitic clay per ton of said material is added to said wetted mass.

13. A method in accordance with claim 10 wherein from about 0.004 to about 0.15 pound of said graft copolymer per ton of said material and from about 12 to about 30 pounds of a soda ash-treated subbentonitic clay per ton of said material is added to said wetted mass.

14. A method in accordance with claim 10 wherein said finely divided material has a size of about 90 percent minus 325 mesh.

15. As a composition of matter, an agglomerate of finely divided material held together by a binder comprising a water-soluble graft copolymer or said graft copolymer and a bentonite clay, said graft copolymer being a graft copolymerization product of acrylic acid and from about 0.1 to about 10 percent, based on the weight of said acrylic acid, of methyl cellulose, or a water-soluble salt of said graft copolymerization product.

16. A composition of matter in accordance with claim 15 containing from about 0.002 to about 20 pounds of said graft copolymer per ton of said material and from about zero to about 30 pounds of said bentonite clay per ton of said material and said graft copolymerization product is an ultraviolet light or peroxygen-type compound graft copolymerization product.

17. A composition of matter in accordance with claim 16 wherein said graft copolymer is a peroxide free radical induced graft copolymerization product, and water in the amount of from about 5 to about 12 percent by weight, based on the weight of said material, is present.

18. A composition of matter in accordance with claim 17 wherein said finely divided material is an iron ore.

19. A composition of matter in accordance with claim 18 wherein said agglomerate is held together by from about 0.5 to about 5 pounds of said graft copolymer per ton of said material.

20. A composition of matter in accordance with claim 18 wherein said agglomerate is held together by from about 0.002 to about 0.15 pound of said graft copolymer per ton of said material and from about 8 to about 30 pounds of a bentonitic clay per ton of said material.

21. A composition of matter in accordance with claim 18 wherein said agglomerate is held together by from about 0.004 to about 0.15 pound of said graft copolymer per ton of said material and from about 12 to about 30 pounds of a soda ash treated subbentonitic clay per ton of said material.

* * * * *